Figure 1:
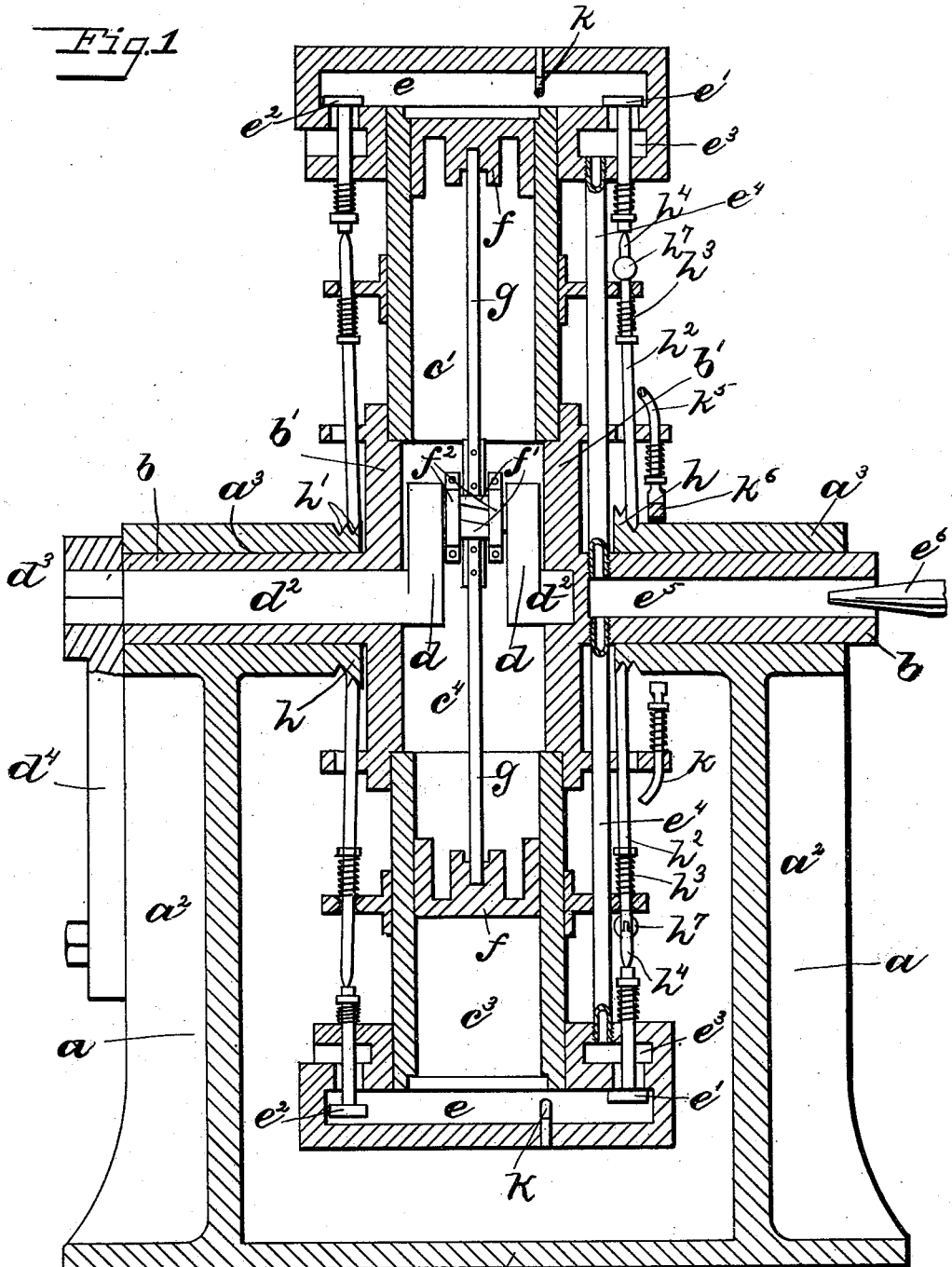

No. 668,617. Patented Feb. 26, 1901.
W. H. ALDRICH.
ROTARY GAS ENGINE.
(Application filed Sept. 18, 1899.)

(No Model.) 3 Sheets—Sheet 1.

No. 668,617. Patented Feb. 26, 1901.
W. H. ALDRICH.
ROTARY GAS ENGINE.
(Application filed Sept. 18, 1899.)
(No Model.) 3 Sheets—Sheet 2.
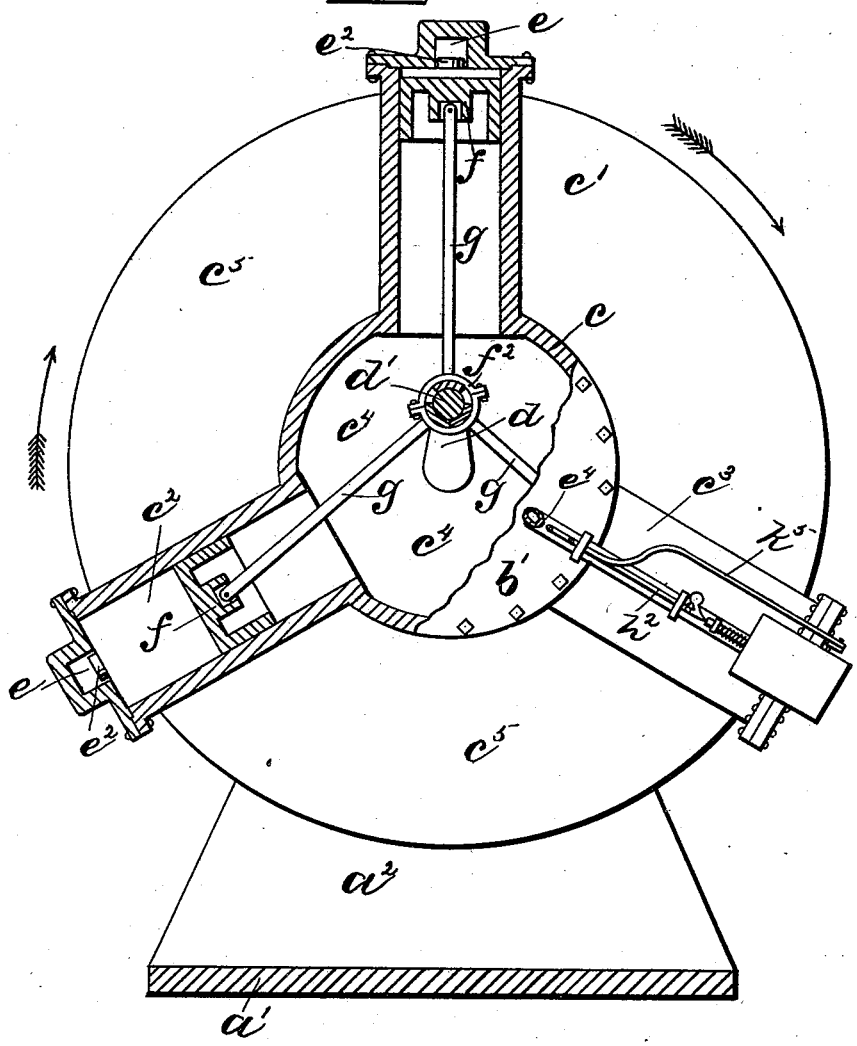
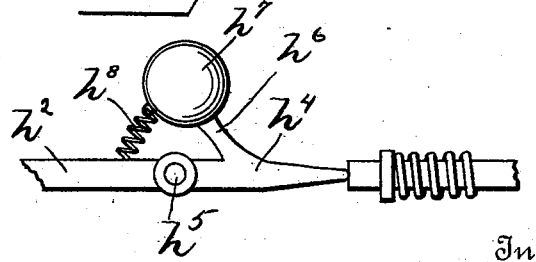
Witnesses
Frank L Walker
Chas. I. Welch
Inventor
William H Aldrich
By his Attorney No. 668,617. Patented Feb. 26, 1901.
W. H. ALDRICH.
ROTARY GAS ENGINE.
(Application filed Sept. 18, 1899.)
(No Model.) 3 Sheets—Sheet 3.
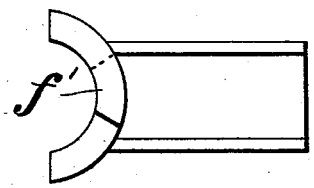
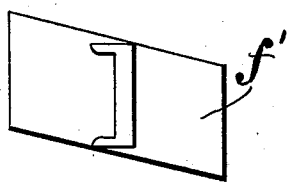
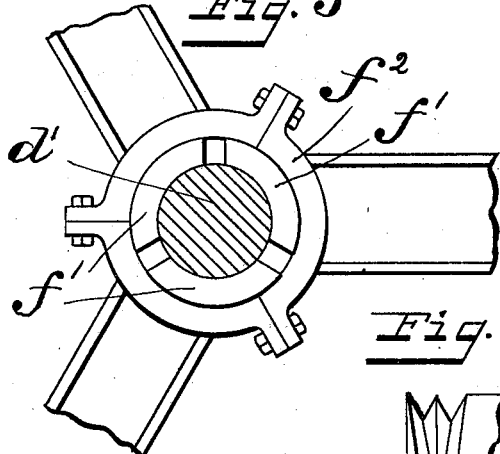
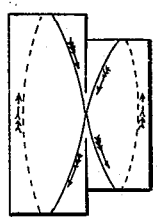
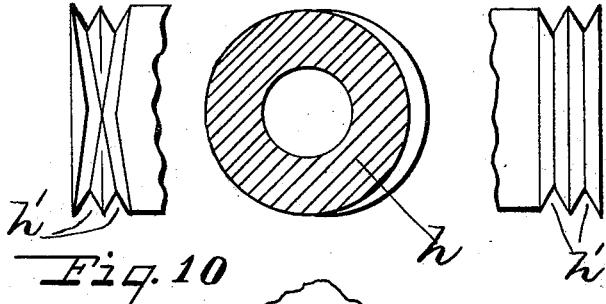
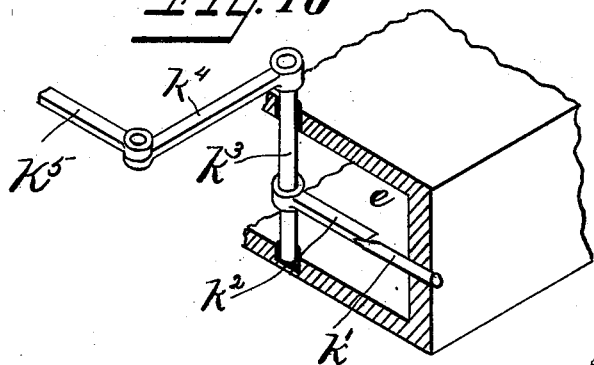
Witnesses
F. L. Walker
Chas. I. Welsh
Inventor
William H. Aldrich
By his Attorney
Paul T. Tuttle

UNITED STATES PATENT OFFICE.

WILLIAM H. ALDRICH, OF SPRINGFIELD, OHIO.

ROTARY GAS-ENGINE.

SPECIFICATION forming part of Letters Patent No. 668,617, dated February 26, 1901.

Application filed September 18, 1899. Serial No. 730,888. (No model.)

*To all whom it may concern:*

Be it known that I, WILLIAM H. ALDRICH, a citizen of the United States, residing at Springfield, in the county of Clark and State of Ohio, have invented certain new and useful Improvements in Engines, of which the following is a specification.

My invention relates to engines; and it is especially adapted for use with gas-engines, though many of the features of construction embodied in my invention may be used in connection with engines generally.

My invention consists in the combinations and constructions of parts hereinafter described, and set forth in the accompanying drawings, in which—

Figure 1 is a sectional elevation of an engine embodying my invention, this view being illustrative in the respect that it assumes one of the cylinders to have been turned to a different position in order to bring them into line, and thus better show the operative parts, an assumption which it is thought will be apparent from the other views and the more detailed description of the parts. Fig. 2 is a transverse sectional view, some of the parts being broken away and shown on a different plane for perspicuity. Fig. 2ª is a detail view of a part of the valve mechanism. Fig. 3 is a sectional view showing the arrangement of the pitman connections with the crank-pin. Figs. 4 and 5 are detailed views of the same. Figs. 6, 7, and 8 are detailed views of the valve-operating cams. Fig. 9 is a diagrammatic view illustrating the travel of the end of the valve-rod. Fig. 10 is a detailed view in perspective of the igniter.

Like parts are represented by similar letters of reference in the respective views.

In constructing my improved engine I employ a frame $a\ a$, consisting, preferably, of a base $a'$ and standards $a^2$, said standards being provided with bearings $a^3$. Within these bearings $a^3$ are located hollow trunnions or sleeves $b$, which are formed integrally with or connected with disks $b'$. These disks are bolted to and are adapted to close the respective ends of a ring or casing $c$, from which the cylinders $c'$, $c^2$, and $c^3$ extend. These cylinders, of which there are three, are preferably spaced equally around the periphery or ring of the casing $c$. They are closed at the outer ends and open at their inner ends into the chamber $c^4$, formed by the casing $c$ and the disks $b'$. Within this chamber $c^4$ the crank $d$ is located. The crank $d$ is of the return type, and the ends of the crank-shaft $d^2$ are journaled in the disks $b'$, one end of the crank-shaft being extended entirely through the sleeve and squared on the end, as shown at $d^3$, and held in a stationary position by means of an arm $d^4$, which is fitted onto the end of the shaft and bolted or otherwise fastened securely to the frame-standard $a^2$, as shown at the left in Fig. 1. By this construction it will be seen that the crank-shaft $d^2$, the crank, and the crank-pin $d'$ are held stationary, while the casing $c$, the cylinders, and the inclosing disks are permitted to rotate. The sleeves or trunnions $b$ furnish the bearing-supports on which the said casing and cylinders revolve. At the outer end of each of the cylinders is a valve-chest $e$, in which are located the inlet-valves $e'$ and the exhaust-valves $e^2$. Each of these valve-chests communicates directly with the outer end of the cylinder which opens into the same. Below the valve $e'$ is a chamber $e^3$, into which leads a pipe $e^4$, which communicates at its outer end with the chamber $e^5$, formed within the sleeve or trunnion $b$. The gas-supply pipe $e^6$ opens into the end of this chamber $e^5$ and is arranged so that a considerable mixture of air and gas is secured therein. It will be understood that the pipe $e^4$ is adapted to convey the explosive mixture from the central supply-chamber $e^5$ to the chamber $e^3$ under each of the inlet-valves $e'$.

The cylinders $c'$, &c., are each provided with pistons $f$ in the usual manner. To each of these pistons is pivotally connected one end of a pitman $g$. Each of these pitmen is provided at its opposite end with a bearing $f'$, and each of these bearings is formed to fit the crank-pin on one side, but is of a width something less than one-third of the circumference of the crank-pin, but constructed spiral in shape, so that while in cross-section it is of a width somewhat less than one-third the circumference of the crank-pin it is of such pitch as will in the length of the crank-pin carry it almost half-way around the same. These spiral sectional bearings are preferably made of a length to equal the length of the crank-pin, and they are held in place against the crank-pin by sectional collars $f^2$, which surround these spiral sectional bearings and permit them to move freely on the crank and between the collars and said crank-pin.

The valves which I have shown are adapted to close with a spring, and means are provided for opening same as follows: Formed on or secured to the bearings $a^3$ are cams $h$. These cams $h$ are each preferably formed with a groove $h'$, and there is arranged an operating-rod $h^2$, having a spring $h^3$, which tends to force the rod inwardly, and thus hold the end of the same within the groove $h'$, the end being shaped to conform in cross-section with the groove, shown preferably V-shaped. The opposite or outer ends of each of these rods is also preferably pointed or V-shaped, so as to contact with the end of the valve-stem, the construction, however, being such that the inner or cam end of the rod is adapted to move laterally by reason of the shape of the cam-groove, hereinafter pointed out, the arrangement giving the lateral movement to the cam-operating rod and providing, in effect, two grooves, one of which runs over the cam and the other of which runs at the side of the cam. At this part of the periphery the grooves are parallel. At the opposite or low side of the cam the grooves run at an angle so as to intersect, and thus, by reason of the end of the operating-rod conforming and being spring-pressed in said groove, cause the same to cross over from one groove to the other, and thus operate the valves only at every other revolution which the cylinders make about the crank-shaft and within the frame.

When this construction is to be used as a gas-engine, an igniter $k$ will be placed in proximity to the ends of the cylinders, preferably within the chamber $e$. These igniters may be of the form shown in Fig. 10, consisting of a stationary electro $k'$ and a moving electro $k^2$. Motion may be given to this electro $k^2$ by supporting same on a rock-shaft $k^3$, having an arm $k^4$, connected by a rod $k^5$, adapted to be operated by cam $k^6$ on the bearing $a^3$, so as to operate the electros to form a spark at the proper point in the revolution of the cylinder.

The rod $h^2$, which operates the inlet-valves, is preferably formed in two parts, as shown in Fig. $2^a$, the outer part $h^4$ being hinged to the inner part, as shown in $h^5$, and provided with an arm $h^6$, having a weight $h^7$ and a spring $h^8$. The hinge is so constructed that in a normal condition the spring $h^8$ keeps the parts in line. In the event, however, that the engine runs at too great a speed the weight $h^7$ will be thrown with great force against spring $h^8$ and throw the parts out of line, so that the ends $h^4$ will not contact with the valve-stem, and thus the charge will not be admitted into this particular cylinder.

The cylinders are preferably connected by a web or flange $c^5$, which serves the purpose of a fly-wheel, and, if desired, these may be replaced with arms which will carry a considerable rim to serve the purpose of a fly and band wheel combined.

The operation of the device is as follows: The cylinders being rotated, the charge of gas is drawn into cylinder $c'$, the engine rotating in the direction of the arrow in Fig. 2. The drawing in of the charge in $c'$ will be continued until the said cylinder reaches a point diametrically opposite. In the meantime the cylinder $c^2$ will be brought to the position occupied by $c'$, and its inlet-valve will be open and its charge begin to be drawn into $c^2$. By the time the cylinder $c^3$ has reached the point at which the charge is to be taken in the cylinder $c'$ will have reached the position occupied by cylinder $c^2$ in Fig. 2 and the charge in said cylinder $c'$ will have been partly compressed. When the cylinder $c'$ has made a complete revolution, the operating-rod which operated its inlet-valve will have crossed into the groove which passes by the side of the cam, and its valve will thus not be opened; but the igniter will be operated, and at this point the charge will be fired. The other cylinders coming to this point in succession will each be fired in succession. Cylinder $c'$ will therefore operate against the crank-pin, and thus furnish the force to rotate the cylinders. The pressure against the crank will be continued until the cylinder reaches a diametrically opposite position for the second time, when the exhaust-valve will be opened by the cam on the opposite side, and during the next half of the revolution this cylinder will be cleaned, the spent gases being forced out by the piston until the cylinder reaches the point at which the new charge is to be taken. It will be understood that by this construction each cylinder is fired every other revolution. There being three cylinders, there will be three charges fired during two revolutions, each cylinder being successively cleared, recharged, compressed, and fired as the engine continues to rotate.

As the angle of each of the pitmen changes by the rotation of the cylinder about the crank the sectional pitmen-bearings will be moved around the crank. By having the sectional bearings made spiral a greater length of bearing is secured around the crank-pin.

Having thus described my invention, I claim—

1. In an engine such as described, a supporting-frame provided with bearings, a rotating casing in said frame formed with hollow trunnions journaled in said bearings, a crank-shaft in said casing, one end of said shaft being journaled in one side of said casing, and the other end of said shaft extended through the opposite side of said casing and its trunnion and secured stationarily to the supporting-frame, a plurality of cylinders connected to said casing and provided with pistons connected by pitmen to said crank-shaft, the hollow trunnion at the side of said casing opposite said shaft being closed at the end adjacent to said casing and open at the other end, a connection from said hollow trunnion to the cylinders and means for supplying an explosive mixture to said hollow trunnion, substantially as described.

2. The combination with a crank, of a plurality of cylinders provided with pistons connected by pitmen with said crank, each of said pistons being provided with a section of a bearing formed spirally about said crank, and a clamping-collar for holding said sections in contact with said crank, substantially as specified.

3. The combination with the main supporting-frame having the stationary bearings, central supporting-disks having hollow trunnions fitted into said bearings, a stationary crank located between said disks and adapted to project through one of said trunnions, means on said frame for holding said crank stationary, a plurality of cylinders connected to said disk each having a piston and a pitman connected thereto, each of said pitmen having a spiral-shaped bearing-section to fit said crank, clamping-collars for holding said sections in contact with said crank, valve-chambers connected to said cylinders, pipe connections from one of said hollow trunnions to said valve-chambers, valves for said valve-chambers, and valve-gear stationary cams on said valve-gear and frame for operating said valves, substantially as and for the purpose specified.

In testimony whereof I have hereunto set my hand this 4th day of September, A. D. 1899.

WILLIAM H. ALDRICH.

Witnesses:
   CHAS. I. WELCH,
   CLIFTON P. GRANT.